No. 866,243. PATENTED SEPT. 17, 1907.
G. WAECHTER.
GRADUATED FOOD PACKAGE.
APPLICATION FILED AUG. 6, 1906.

Witnesses
Inventor:

UNITED STATES PATENT OFFICE.

GUSTAV WAECHTER, OF ELVERDISSEN, NEAR HERFORD, GERMANY.

GRADUATED FOOD-PACKAGE.

No. 866,243.　　　　Specification of Letters Patent.　　　　Patented Sept. 17, 1907.

Application filed August 6, 1906. Serial No. 329,431.

*To all whom it may concern:*

Be it known that I, GUSTAV WAECHTER, a subject of the Emperor of Germany, and a resident of Elverdissen, near Herford, Germany, have invented certain new and useful Improvements in a Graduated Food-Package, of which the following is a specification.

This invention relates to an improved package for teas, cocoas and the like for the retail trade, and has for its object the provision of such a package whereby the contents may be divided into quantities adapted for use in making a given amount of tea or cocoa, and wherein such quantities are indicated to the consumer so that the latter may be enabled to make an economical use thereof by utilizing only so much of the material as is necessary for the amount of the finished article desired.

It is well known that in making tea or like beverages from the usual canister a considerable amount of waste occurs incident to the use of more than the required amount of tea measured out. Furthermore such waste occurs even when instructions are given regarding the use of the material owing to the lack of suitable measuring devices for obtaining the requisite amount of material to be used for providing the required quantity of brew. For instance, if tea is employed a careless user may, even if provided with a separate measuring receptacle, use more than the required amount of tea or other material.

It is the object of the present invention to provide a combined package and measuring device or graduate whereby only the exact amount of material required can be obtained thereby avoiding the waste incident to careless measurement.

The invention will be more fully described in connection with the accompanying drawing and will be more particularly pointed out and ascertained in and by the appended claims.

Figure 2:
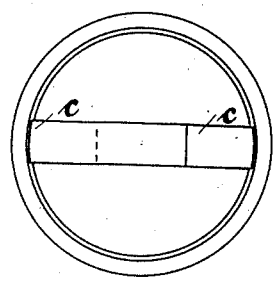
Figure 1:
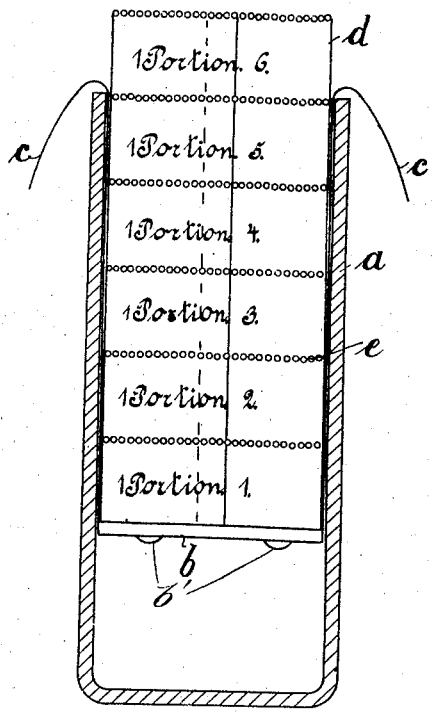
Figure 3:
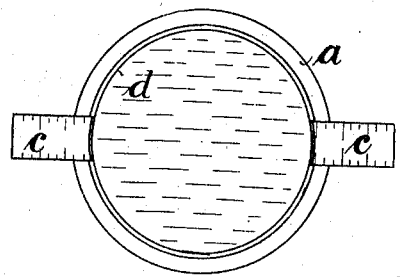

In the drawing: Figure 1 is a vertical sectional view partly in elevation of an improved measuring package embodying the main features of my invention. Fig. 2 is a plan view thereof showing the package adapted to be closed by a cover. Fig. 3 is a plan view of the package as shown in Fig. 1.

Like characters of reference designate similar parts throughout the different figures of the drawing.

The invention consists broadly in the provision of an outer container provided with a false bottom upon which the material is deposited together with means for raising the bottom in the container a prescribed distance to discharge from the upper end thereof a given amount of the contents.

Considered more specifically, the invention comprises as shown an outer container $a$ closed at its lower end and open at its upper end and adapted to be closed thereat in any suitable manner by a cap or the like not shown. Within the container $a$ there is provided a false bottom $b$ approximately equal in size to the dimensions of the container $a$ and adapted to fit closely therein with the required working clearance. Means are provided for elevating the bottom $b$ in the container to discharge therefrom a given quantity of material which consists, as shown, of a strap or cord $c$ connected with the bottom $b$ in any suitable manner as for instance by being passed below said bottom and secured thereto by brads $b'$. The free ends of said strap are adapted to project upwardly in the container alongside the walls thereof and are of sufficient length to extend beyond said walls to permit the user to grasp the same. I preferably mount upon the bottom $b$ an inner container $d$ in which the material is deposited and provide the said container $d$ with suitable graduations as shown in Fig. 1.

In the most improved embodiment of the invention the measuring container $d$ is divided into sections which are adapted to be removed by the user in obtaining the desired amount of material. As shown, the removal of sections is facilitated by providing the container $d$ with circumferentially disposed perforations $e$ arranged in rows spaced apart from each other and dividing the measuring container $d$ into sections containing a given amount of the material. When the package is first put up the measuring container $d$ with the false bottom $b$ will be equal in height to the container $a$. Assuming that the consumer desires to obtain a quantity of material sufficient for making three or four cups of tea or the like and that such quantity is contained in a section designated by one portion, the strap $c$ will be grasped and the measuring container $d$ raised until the first row of perforations register with the upper margin of the container $a$ as shown in Fig. 1. The section 6 will then be torn off from the body of the container on the line of the perforations and the outer portions of the material contained in said section will descend over the sides of the container $a$ into a suitable receptacle at hand whereupon the central portions of the material remaining, assuming that the package is in a vertical position, will be removed by drawing a knife or other instrument across the top of the container in a well known manner. Where the measuring container $d$ is not used the strap $c$ may be graduated as shown in Fig. 3 and the operation of removing given quantities of material be similar to the operation just described with the exception of tearing off sections of the container $d$.

It will be obvious that if the container $d$ is used in connection with the container $a$ and it is desired to measure off a quantity of the contents less than that contained in the several portions the operator will raise the bottom $b$ by means of the strap $c$ and will be guided by the graduations thereon to measure the desired quantity of material and thereupon the portion of the container $d$ projecting above the container $a$ may be severed by a knife or suitable instrument.

I claim:

1. A graduated food package comprising in combination, a container, a false bottom therefor on which the material of the container is supported, and graduated straps connected with said bottom and projecting beyond said container.

2. A graduated food package comprising in combination, a container, a false bottom therefor, an inner graduated container disposed upon said false bottom, and graduated straps connected with said false bottom and projecting upwardly in said container.

3. A graduated food package comprising in combination, a container, a false bottom therefor on which the material of the container is supported, and flexible graduated means for raising and lowering said false bottom.

4. A graduated food package comprising in combination, a container, a false bottom therefor, an inner graduated container disposed upon said false bottom, and flexible graduated means for raising and lowering said false bottom.

5. A graduated food package comprising in combination, a container, a false bottom therefor, an inner graduated container disposed upon said false bottom, and flexible means for raising and lowering said false bottom.

In testimony whereof I affix my signature in presence of two witnesses.

GUSTAV WAECHTER.

Witnesses:
HENRY T. FULLER,
LEONORE RASCH.